(12) United States Patent
Nagaraja et al.

(10) Patent No.: US 10,736,010 B2
(45) Date of Patent: Aug. 4, 2020

(54) REFERENCE BEAM FOR EVENT TRIGGER IN MOBILITY MANAGEMENT

(71) Applicant: QUALCOMM Incorporated, San Diego, CA (US)

(72) Inventors: Sumeeth Nagaraja, San Diego, CA (US); Tao Luo, San Diego, CA (US); Sony Akkarakaran, Poway, CA (US); Makesh Pravin John Wilson, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/703,555

(22) Filed: Sep. 13, 2017

(65) Prior Publication Data

US 2018/0103407 A1    Apr. 12, 2018

Related U.S. Application Data

(60) Provisional application No. 62/405,757, filed on Oct. 7, 2016.

(51) Int. Cl.
*H04W 36/30* (2009.01)
*H04W 24/10* (2009.01)
(Continued)

(52) U.S. Cl.
CPC ........... *H04W 36/30* (2013.01); *H04W 24/02* (2013.01); *H04W 24/10* (2013.01); *H04W 72/044* (2013.01); *H04B 17/318* (2015.01); *H04L 5/0048* (2013.01); *H04W 16/28* (2013.01); *H04W 36/0072* (2013.01);
(Continued)

(58) Field of Classification Search
CPC .. H04B 7/0632; H04B 7/0408; H04B 7/0617; H04B 17/318; H04W 72/1284; H04W 74/004; H04W 74/006; H04W 84/042; H04W 36/0083; H04W 24/10; H04W 24/08; H04W 36/0094; H04W 36/32; H04W 74/0833; H04W 36/0005; H04W 36/30; H04W 72/044; H04W 24/02;
(Continued)

(56) References Cited

U.S. PATENT DOCUMENTS 10,431,888 B2 * 10/2019 Seol ......................... H01Q 3/30
2014/0073329 A1 * 3/2014 Kang ................... H04W 36/30
455/439

(Continued)

OTHER PUBLICATIONS

International Search Report and Written Opinion—PCT/US2017/051515—ISA/EPO—dated Nov. 7, 2017.
(Continued)

*Primary Examiner* — Khawar Iqbal
(74) *Attorney, Agent, or Firm* — Patterson & Sheridan, L.L.P.

(57) ABSTRACT

Certain aspects of the present disclosure provide techniques for supporting mobility management in a wireless communication system employing beams. A UE may receive, from a BS serving the UE, information regarding one or more reference beams and one or more event triggers associated with the one or more reference beams. The UE may detect one of the event triggers and may take one or more actions based, at least in part, on the detected event trigger.

26 Claims, 9 Drawing Sheets

(51) Int. Cl.
*H04W 24/02* (2009.01)
*H04W 72/04* (2009.01)
*H04W 36/00* (2009.01)
*H04W 16/28* (2009.01)
*H04B 17/318* (2015.01)
*H04L 5/00* (2006.01)
*H04W 56/00* (2009.01)
*H04W 88/02* (2009.01)
*H04W 88/08* (2009.01)

(52) U.S. Cl.
CPC ........ *H04W 56/001* (2013.01); *H04W 72/046* (2013.01); *H04W 88/02* (2013.01); *H04W 88/08* (2013.01)

(58) Field of Classification Search
CPC ... H04W 56/001; H04W 88/08; H04W 88/02; H04L 5/0048; H04L 5/0051
See application file for complete search history.

(56) References Cited

U.S. PATENT DOCUMENTS

| | | | |
|---|---|---|---|
| 2014/0120926 A1 | 5/2014 | Shin et al. | |
| 2016/0006122 A1 | 1/2016 | Seol et al. | |
| 2016/0142959 A1* | 5/2016 | Wang | H04W 36/245 455/436 |
| 2016/0183233 A1* | 6/2016 | Park | H04W 16/30 |
| 2017/0033854 A1* | 2/2017 | Yoo | H04W 24/00 |
| 2017/0207843 A1* | 7/2017 | Jung | H04B 7/0408 |
| 2017/0215117 A1* | 7/2017 | Kwon | H04B 7/04 |
| 2018/0049081 A1* | 2/2018 | Tseng | H04W 24/10 |
| 2018/0123675 A1* | 5/2018 | Shi | H04B 7/0695 |
| 2019/0104549 A1* | 4/2019 | Deng | H04L 27/2607 |
| 2019/0159054 A1* | 5/2019 | Yiu | H04B 17/318 |
| 2019/0199615 A1* | 6/2019 | Zhang | H04L 43/16 |
| 2019/0268782 A1* | 8/2019 | Martin | H04B 17/318 |
| 2019/0313308 A1* | 10/2019 | Li | H04W 24/02 |
| 2019/0313314 A1* | 10/2019 | Yang | H04W 24/10 |
| 2019/0319686 A1* | 10/2019 | Chen, IV | H04W 72/046 |
| 2020/0028599 A1* | 1/2020 | Zhang | H04B 7/08 |

OTHER PUBLICATIONS

Mediatek Inc: "Mobility Procedures in NR Networks", 3GPP Draft; R2-165107, 3rd Generation Partnership Project (3GPP), Mobile Competence Centre, 650, Route Des Lucioles, F-06921, Sophia-Antipolis Cedex, France, vol. RAN WG2, No. Gothenburg, Sweden; Aug. 21, 2016, XP051140925, Retrieved from the Internet: URL:http://www.3gpp.org/ftp/Meetings_3GPP_SYNC/RAN2/Docs/ [retrieved on Aug. 21, 2016], 5 pages.

Qualcomm Incorporated: "Mobility Procedure Consideration", 3GPP Draft; R1-1705573, 3rd Generation Partnership Project (3GPP), Mobile Competence Centre, 650, Route Des Lucioles, F-06921, Sophia-Antipolis Cedex, France, vol. RAN WG1, No. Spokane, USA; Apr. 2, 2017, XP051243701, Retrieved from the Internet: URL:http://www.3gpp.org/ftp/Meetings_3GPP_SYNC/RAN1/Docs/ [retrieved on Apr. 2, 2017], 8 pages.

* cited by examiner

REFERENCE BEAM FOR EVENT TRIGGER IN MOBILITY MANAGEMENT

CROSS-REFERENCE TO RELATED APPLICATIONS

This application claims priority to U.S. Provisional Application Ser. No. 62/405,757, entitled "REFERENCE BEAM FOR EVENT TRIGGER IN MOBILITY MANAGEMENT," filed on Oct. 7, 2016, which is expressly incorporated by reference herein in its entirety.

INTRODUCTION

Aspects of the present disclosure relate to wireless communications systems, and, more particularly, for defining one or more reference beams for mobility management.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure generally relate to methods and apparatus for defining one or more reference beams for mobility management.

Certain aspects of the present disclosure provide a method for wireless communication that may be performed, for example, by a UE. The method includes receiving, from a base station (BS) serving the UE, information regarding one or more reference beams and one or more event triggers associated with the one or more reference beams, detecting one of the event triggers, and taking one or more actions based, at least in part, on the detected event trigger.

Certain aspects of the present disclosure provide a method for wireless communication that may be performed, for example, by a BS. The method includes transmitting, to a user equipment (UE) served by the BS, information regarding one or more reference beams and one or more event triggers associated with the one or more reference beams, receiving an indication of one of the event triggers, and taking one or more actions based, at least in part, on the indication.

Certain aspects of the present disclosure provide an apparatus for wireless communication that may be performed, for example, by a UE. The apparatus includes means for receiving, from a base station (BS) serving the UE, information regarding one or more reference beams and one or more event triggers associated with the one or more reference beams, means for detecting one of the event triggers, and means for taking one or more actions based, at least in part, on the detected event trigger.

Certain aspects of the present disclosure provide an apparatus for wireless communication that may be performed, for example, by a BS. The apparatus includes means for transmitting, to a user equipment (UE) served by the BS, information regarding one or more reference beams and one or more event triggers associated with the one or more reference beams, means for receiving an indication of one of the event triggers, and means for taking one or more actions based, at least in part, on the indication.

Certain aspects of the present disclosure provide an apparatus for wireless communication that may be performed, for example, by a UE. The apparatus includes at least one processor and a memory coupled to the at least one processor. The at least one processor is configured to receive, from a base station (BS) serving the UE, information regarding one or more reference beams and one or more event triggers associated with the one or more reference beams, detect one of the event triggers, and take one or more actions based, at least in part, on the detected event trigger.

Certain aspects of the present disclosure provide an apparatus for wireless communication that may be performed, for example, by a BS. The apparatus includes at least one processor and a memory coupled to the at least one processor. The at least one processor is configured to transmit, to a user equipment (UE) served by the BS, information regarding one or more reference beams and one or more event triggers associated with the one or more reference beams, receive an indication of one of the event triggers, and take one or more actions based, at least in part, on the indication.

Certain aspects of the present disclosure provide a computer readable medium for wireless communication by a UE having computer-executable instructions stored thereon for receiving, from a base station (BS) serving the UE, information regarding one or more reference beams and one or more event triggers associated with the one or more reference beams, detecting one of the event triggers, and taking one or more actions based, at least in part, on the detected event trigger.

Certain aspects of the present disclosure provide a computer readable medium for wireless communication by a BS having computer-executable instructions stored thereon for transmitting, to a user equipment (UE) served by the BS, information regarding one or more reference beams and one or more event triggers associated with the one or more reference beams, receiving an indication of one of the event triggers, and taking one or more actions based, at least in part, on the indication.

Aspects include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
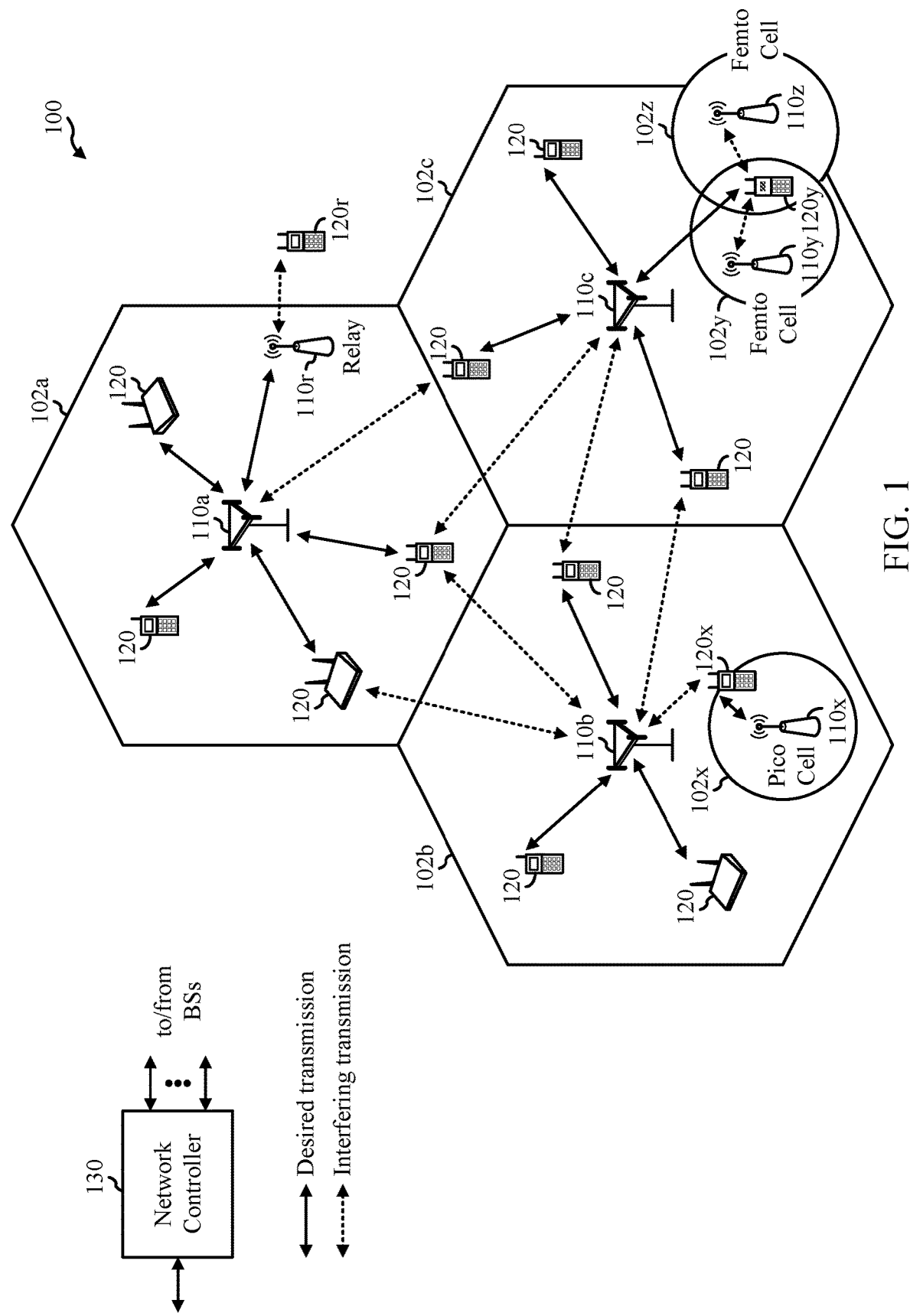
FIG. 1 is a block diagram conceptually illustrating an example telecommunications system, in accordance with certain aspects of the present disclosure.

Aspects of the present disclosure provide techniques and apparatus for supporting mobility management using one or more reference beams. As described herein, mobility management may refer to a UE handover from a serving BS to a neighboring BS. Mobility management may refer to beam switching by the serving BS, where the serving BS switches from a first beam to a second beam to serve the UE.

In wireless communication systems employing beams, such as mmWave systems, high path loss may present a challenge. Accordingly, techniques including hybrid beamforming (analog and digital), which are not present in 3G and 4G systems, may be used in mmWave systems. Hybrid beamforming creates narrow beam patterns to users (e.g., UEs), which may enhance link budget/SNR.

In communication systems employing beams, a BS and UE may communicate over active beams. Active beams may be referred to as serving beams, reference beams, or quasi-colocated (quasi-colocation, QCL) beams. Stated otherwise, according to an example, active beams, serving beams, reference beams, and QCL beams may be used interchangeably. According to an example, QCL beams refer to transmissions using the same or similar beamforming as active or serving beams for which the QCL beam serves as a reference. Accordingly, QCL beams experience similar channel conditions for the active or serving beams.

Two antenna ports are said to be quasi co-located if properties of the channel over which a symbol on one antenna port is conveyed can be inferred from the channel over which a symbol on the other antenna port is conveyed. QCL supports beam management functionality including determining/estimating spatial parameters, frequency/timing offset estimation functionality including determining/estimating Doppler/delay parameters, and radio resource management (RRM) functionality including determining/estimating average gain. A network (e.g., BS) may indicate to a UE that the UE's data and/or control channel may be transmitted in the direction of a transmitted reference signal. The UE may measure the reference signal to determine characteristics of the data and/or control channel.

According to one example, the BS may configure a UE with four beams, each associated with a different direction and different beam identification. The BS may indicate to the UE a switch from a current active beam to one of the four configured beams. Following a beam switch command, both the UE and BS may switch to a particular beam. When a reference beam is QCL to data or control beams, the measurements the UE makes associated with a reference signal transmitted on a reference beam applies to the data or control channel, respectively. In this manner, the performance of the data or control channel may be measured using quasi-colocated reference beams.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Aspects of the present disclosure provide apparatus, methods, processing systems, and computer readable mediums for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be implemented. For example, the wireless network may be a new radio (NR) or 5G network.

In legacy wireless communication system, mobility management may be based, at least in part, on cell-specific reference signals (CRSs), periodically transmitted by each cell in the system. In wireless communication systems employing beams, CRSs may not be present. According to aspects of the present disclosure, one or more reference beams may be used to determine event triggers for mobility management.

As will be described in more detail herein, a UE may receive, from a serving BS, information regarding one or more reference beams and one or more event triggers associated with the one or more reference beams. The UE may perform measurements on the reference beams in an effort to detect an event trigger. The information regarding the event triggers may specify which reference beams are associated with a specific event trigger. In response to detecting an event trigger, the UE may transmit, via a report, an indication of the event trigger to the serving BS. Mobility management decisions may be based, at least in part, on the detected event trigger.

Correspondingly, a serving BS may transmit, to a UE, information regarding one or more reference beams and one or more event triggers associated with the one or more reference beams. The information may specify which event triggers correspond to which reference beam. The BS may receive an indication of a detected event trigger and may make take one more actions based on the indication. For example, the BS may make mobility management decisions based on the detected event trigger.

UEs 120 may be configured to perform the operations 900 and other methods described herein and discussed in more detail below for mobility management using reference beams. Base station (BS) 110 may comprise a transmission reception point (TRP), Node B (NB), gNB, access point (AP), new radio (NR) BS, gNodeB, 5GNB, etc.). The NR network 100 may include the central unit. The BS 110 may perform complementary operations to the operations 900 performed by the UE. The BS 110 may perform the operations 1000 and other methods described herein for mobility management using reference beams.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
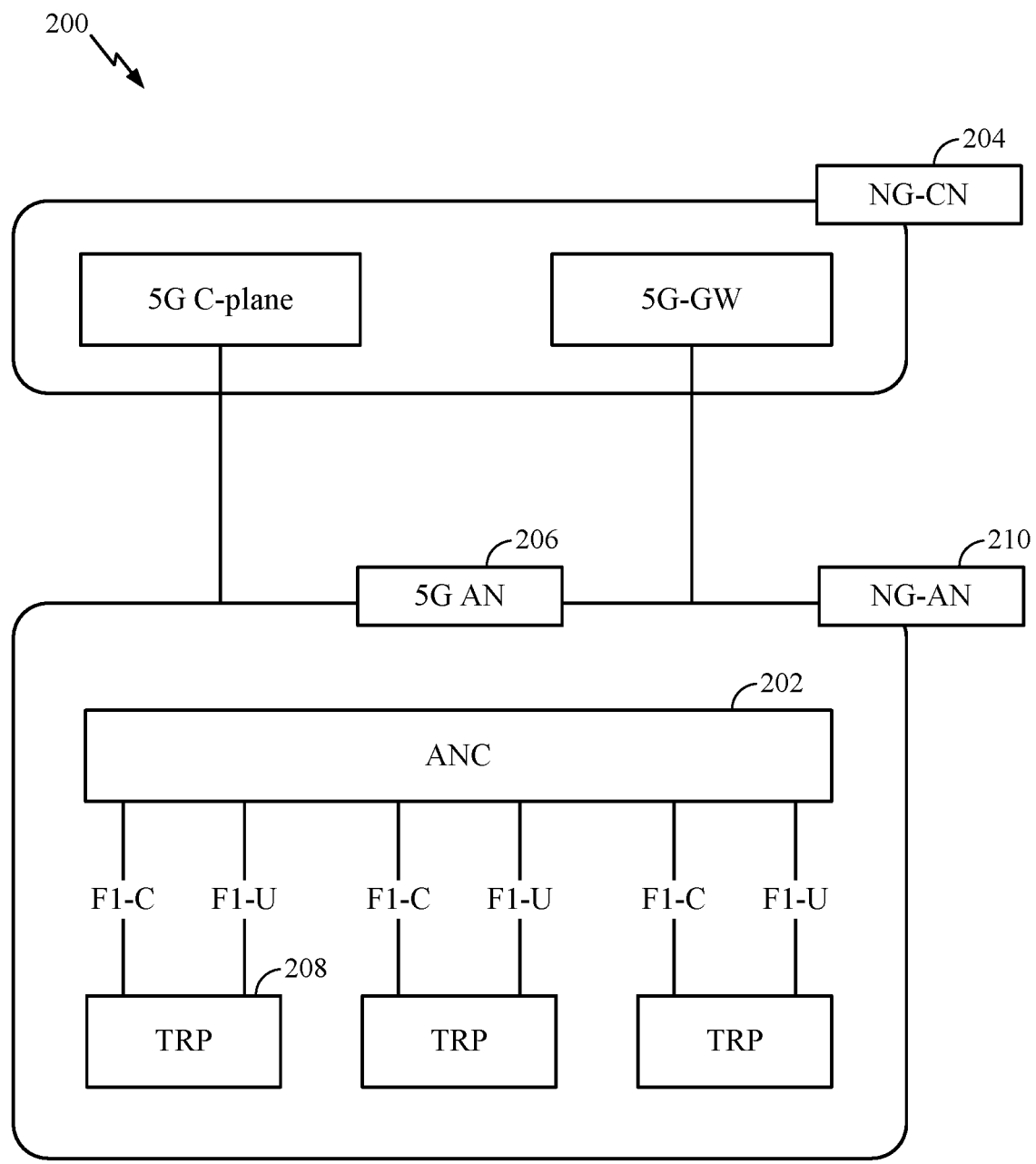
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
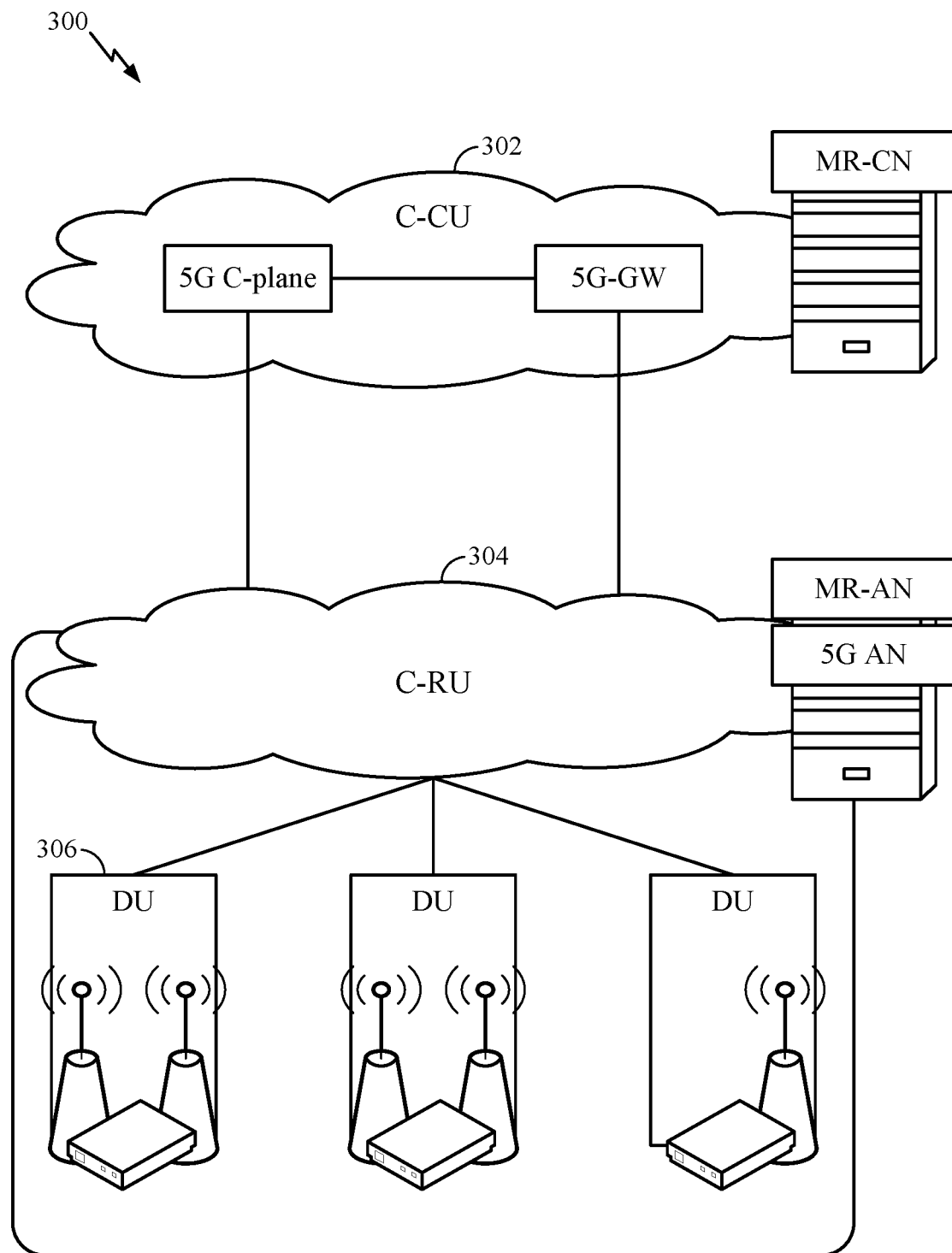
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
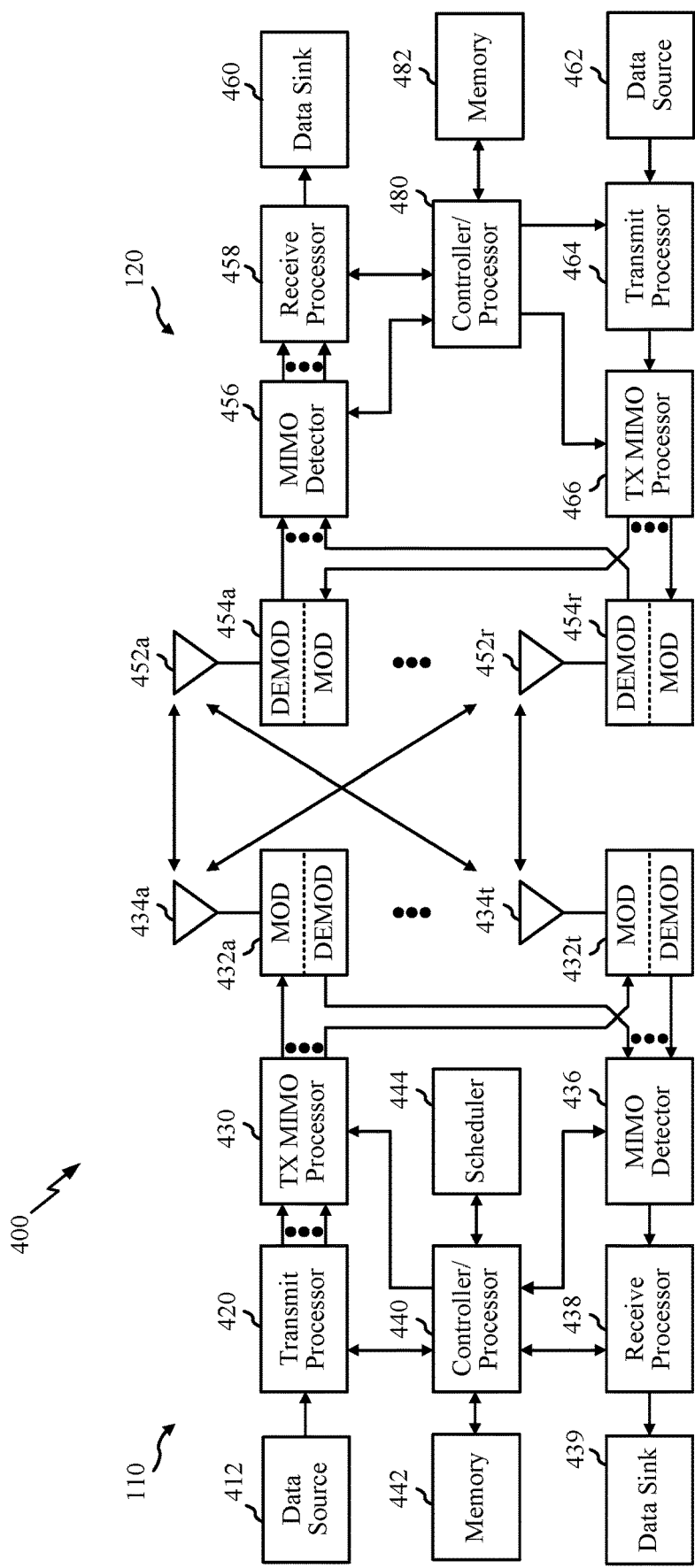
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or a gNB. One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, Tx/Rx 432, processors 420, 430, 438, and/or controller/processor 440 of the BS 110 may be used to perform the operations described herein and illustrated with reference to FIGS. 9-10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 10, and/or other processes for the techniques described herein and for those illustrated in the appended drawings. The processor 480 and/or other processors and modules at the UE 120 may also perform or direct, e.g., the execution of the functional blocks illustrated in FIG. 9, and/or other processes for the techniques described herein and those illustrated in the appended drawings. The memories 442 and 482 may store data and program codes for the BS 110 and the UE 120, respectively. A scheduler 444 may schedule UEs for data transmission on the downlink and/or uplink.

Figure 5:
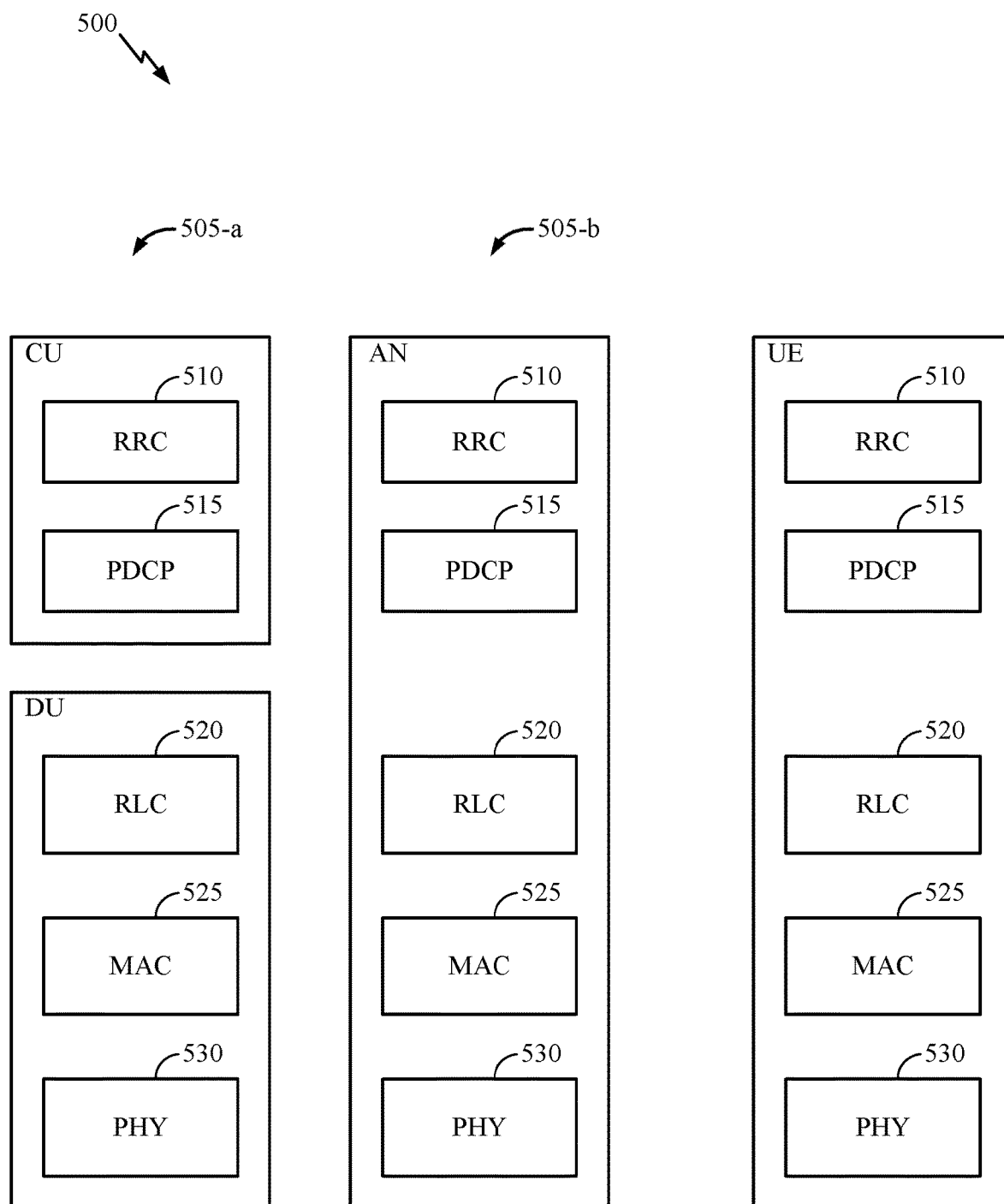
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
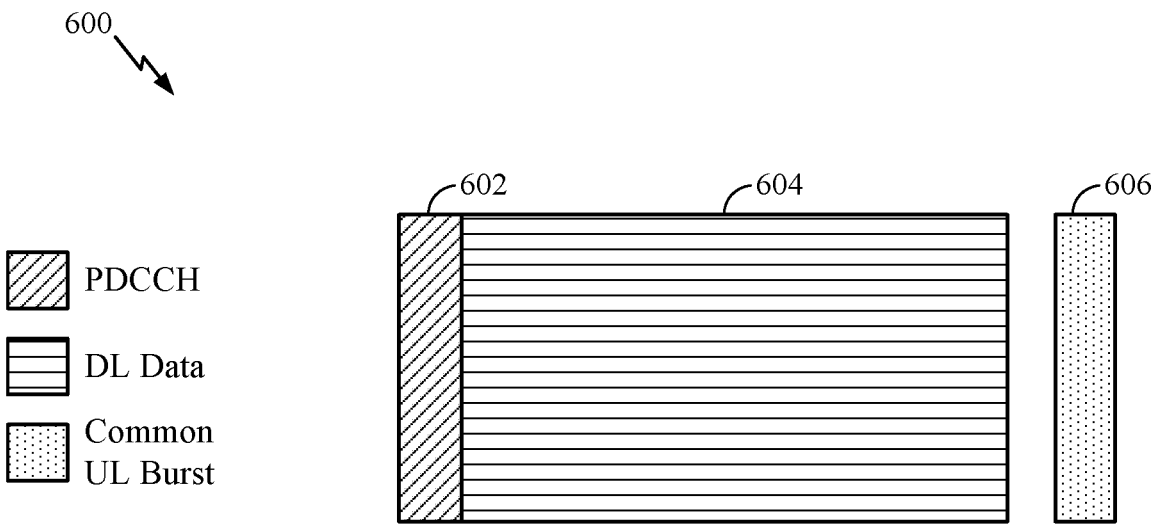
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
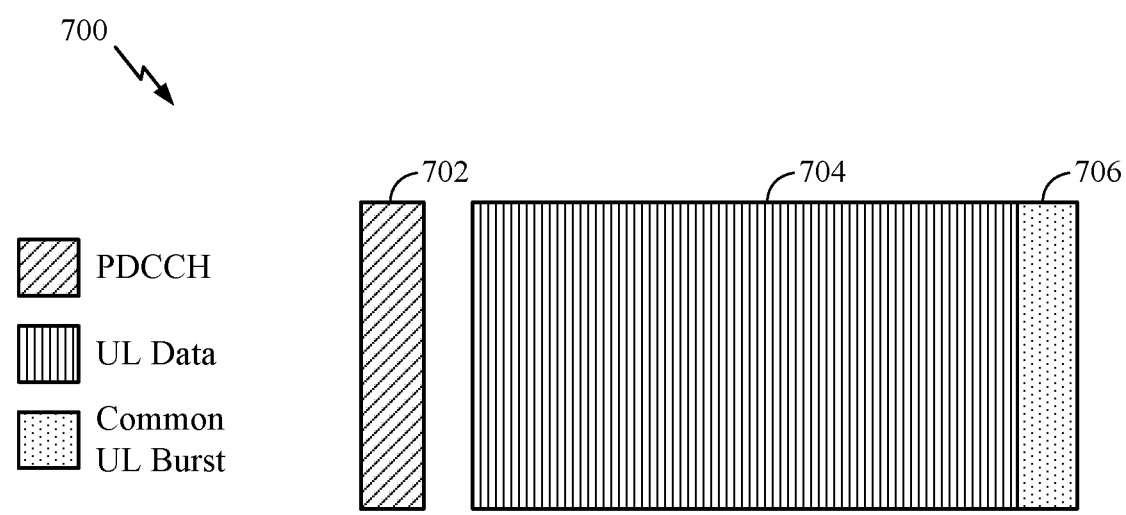
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Reference Beam for Event Trigger in Mobility Management

Some legacy wireless communication standards base UE mobility decisions on cell-specific reference signals (CRS). For example, a CRS may be transmitted in a radio frame, a UE may measure the CRS, and the UE may report a reference signal receive power (RSRP) associated with the measured CRS to a BS. Because every cell may transmit a CRS, the measured RSRP may be "linked" to a cell. Measuring CRS from a serving cell and one or more non-serving cells may be used to make handover decisions.

Thus, as described above, the serving cell may serve as a reference point for CRS measurements (e.g., to determine if a UE should handover to a neighboring cell). In LTE for example, the RSRP associated with the serving cell may be measured using CRS. The RSRP may be compared with the RSRP associated with a neighboring cell. The RSRP associated with a neighbor cell becoming stronger than the RSRP associated with the serving cell may trigger an Event A3 (e.g., may trigger intra LTE mobility).

In wireless communication systems employing beams, such as mmWave systems, a BS and UE may communicate over active beams. Active beams may be referred to as serving beams, reference beams, and/or QCL beams. Active beams may include BS and UE beam pairs that carry data and control channels such as PDSCH, PDCCH, PUSCH, and PUCCH.

In wireless communication systems employing beams, a defined reference beam for a BS used to transmit a reference signal may not exist because, for example, in multi-beam operation, the active/serving/reference/QCL beams may not be fixed. Instead, the active/serving/reference/QCL beams may change over time. Accordingly, a reference point for a mobility event trigger may change over time. A mobility event may refer to a change in an active/serving/reference/QCL beam associated with a serving BS or inter-cell handover of the UE.

Aspects of the present disclosure provide methods for defining one or more reference beams for mobility management and determining an event trigger associated with the one or more reference beams. An identified event trigger may be used for mobility management in wireless communication systems using beams.

Figure 8:
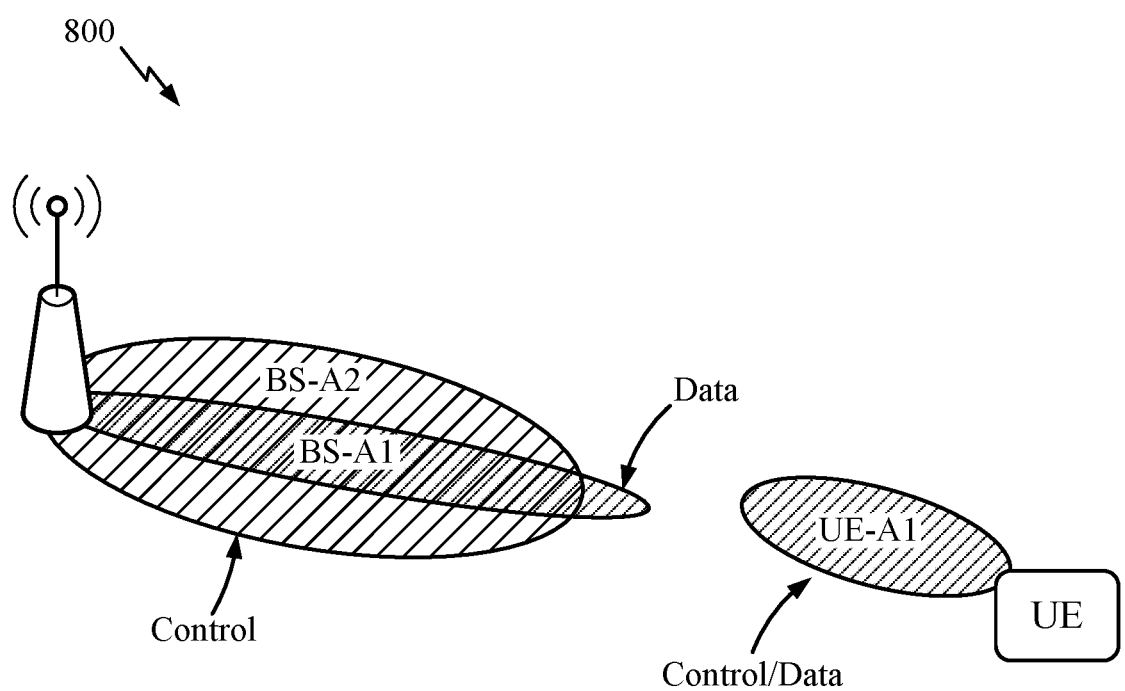
FIG. 8 illustrates an example of active beams, in accordance with certain aspects of the present disclosure.

FIG. 8 illustrates an example of active beams 800. A set of active beams may be associated with the BS and a set of active beams may be associated with the UE. Active beams may be used to transmit data and control channels. As illustrated in FIG. 8, beam BS-A1 may be used to transmit DL data and beam BS-A2 may be used to transmit DL control information. Beam UE-A1 may be used to transmit both control and data. As illustrated, both UL control and data are transmitted using a same beam; however, the data and control information may be transmitted using different beams. Similarly, data and control may be transmitted by the BS using different beams (as illustrated in FIG. 8) or a same beam.

According to an example, because active or serving beams may carry control and/or data, mobility management decisions may be based on other beams, which may be referred to herein as reference beams. A reference beam may be used to transmit a reference signal. Thus, according to aspects of the present disclosure, a UE may be configured to measure reference beams which are not carrying data and/or control information. The reference beams may change over time. Mobility management may refer to handover from a serving BS to a target BS or beam switching, wherein a serving BS switches the beam it is using to serve the UE.

Figure 9:
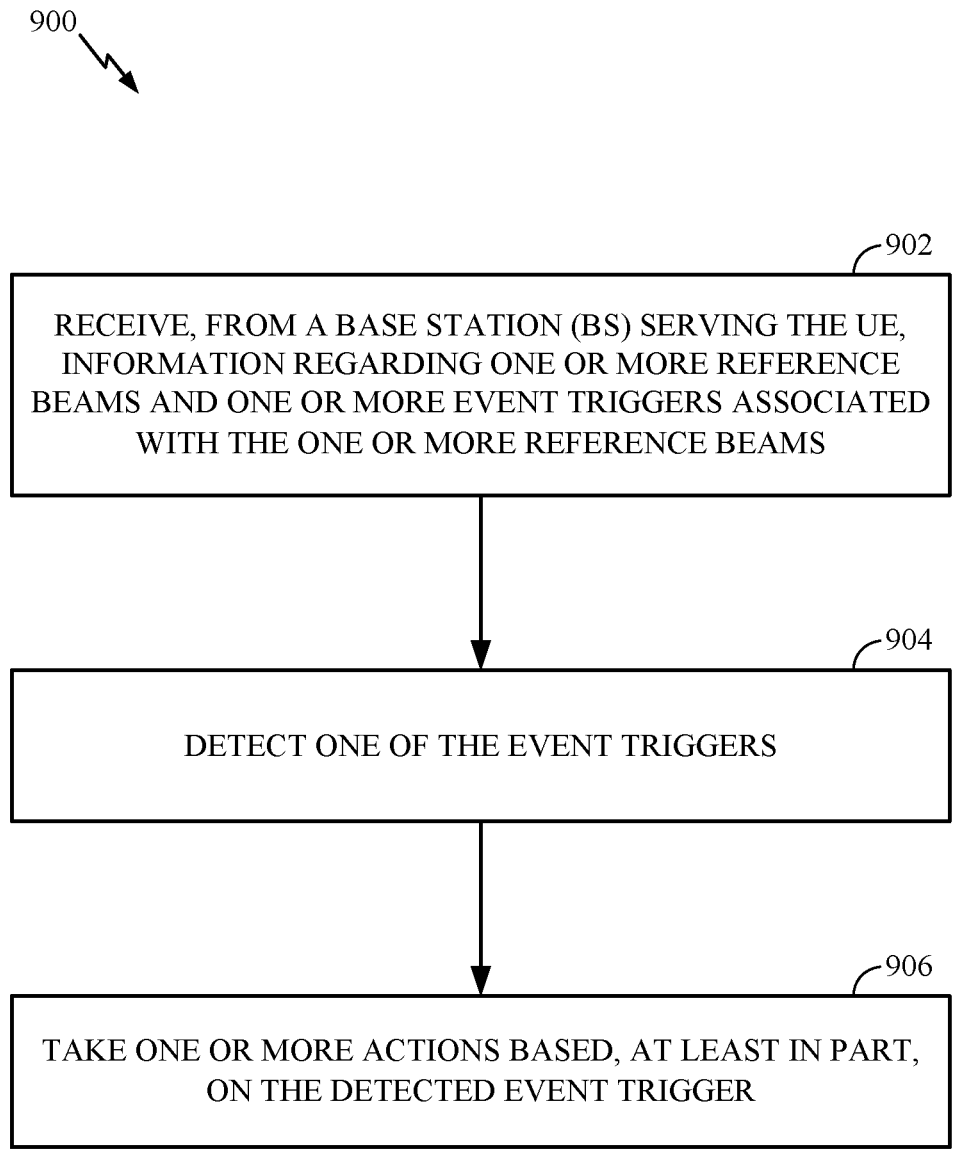
FIG. 9 illustrates example operations performed by a UE, in accordance with certain aspects of the present disclosure.

FIG. 9 illustrates example operations 900, which may be performed by UE, according to aspects of the present disclosure. The UE may include one or more modules of UE 120 illustrated in FIG. 4.

At 902, the UE may receive, from a BS serving the UE, information regarding one or more reference beams and one or more event triggers associated with the one or more reference beams. At 904, the UE may detect one of the event triggers. At 906, the UE may take one or more actions based, at least in part, on the detected event trigger.

The event trigger may be based on measurements associated with any combination of reference beams. For example, the event trigger may be based on a combination of UL or DL signals transmitted using the reference beams. For example, the trigger event may be based on a combination of signals received by the UE from the BS on one or more of the reference beams and/or signals transmitted by the UE (to the BS) on one or more of the reference beams. Additionally, the reference beams may be associated with a serving BS, a neighboring BS, or a combination of both the serving BS and the neighboring BS.

Figure 10:
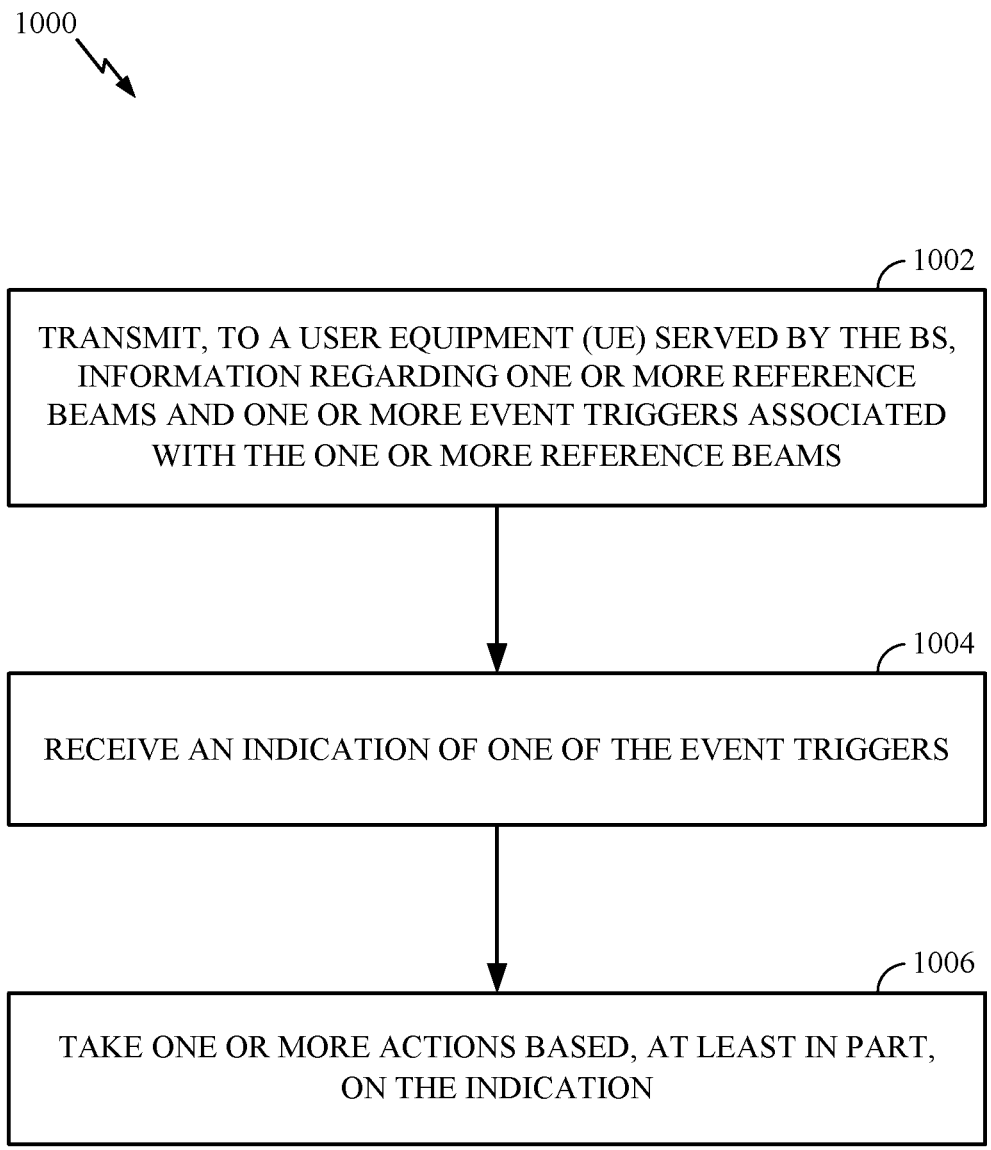
FIG. 10 illustrates example operations performed by a BS, in accordance with certain aspects of the present disclosure.

FIG. 10 illustrates example operations 1000, which may be performed by a BS, according to aspects of the present disclosure. The BS may include one or more modules of the BS 110 illustrated in FIG. 4.

At 1002, the BS may transmit, to a UE served by the BS, information regarding one or more reference beams and one or more event triggers associated with the one or more reference beams. At 1004, the BS may receive an indication of one of the event triggers. At 1006, the BS may take one or more actions based, at least in part, on the indication.

The BS may configure the UE with one or more reference beams associated with the serving BS and/or neighboring BS. The event trigger may be associated with any combination of signals (1) transmitted by the BS on one or more of the reference beams or (2) signals received by the BS, from the UE, on one or more of the reference beams. In this manner, UL transmissions, DL transmissions, or a combination thereof may be used to determine an event trigger using the reference beams. Beams may include BS beams (e.g., used to transmit to a UE) or BS-UE beam pairs (e.g., beams used by a BS to transmit to a UE, and beams used by the UE to transmit to the BS).

A BS may signal one or multiple reference beams. As the active beam(s) may not be fixed and may change over time, the reference beams for a particular UE may also change with time. Reference beams may not carry data and/or control information and may be used as a reference point for mobility management. Event triggers for mobility management may be determined based, at least in part, on measurement associated with the one or more reference beams.

The reference beams may be based on a beam identification. A BS may indicate or configure a UE with one or more beam IDs which may be used as reference beams by the UE. The beams may be in synchronization subframe, such as, for example, in a primary synchronization signal (PSS)/secondary synchronization signal (SSS)/reference signal (RS). The one or more reference beams may be part of or transmitted in a synchronization subframe. For example, the reference beams may be part of the PSS, SSS, and/or RS.

According to aspects, the reference beam may be configured on-demand, based on a reference signal, such as a measurement reference signal (MRS), beam reference signal, channel state information-reference signal (CSI-RS), etc. For example, a serving BS may transmit, to a UE, a request for a measurement and then the BS may transmit a RS. The UE may measure the RS and may transmit a report/measurement report indicating the signal strength of the RS to the serving BS. The serving BS may select and configure the UE with one or more reference beams based on the received report/measurement report.

According to aspects, the UE may receive signaling indicating the reference beams via Layer 1/Layer 2 control channels, Layer 3 signaling, or a combination of thereof.

Once the one or more reference beams are known to the UE, the UE may receive information regarding one or more event triggers. An event trigger may be used to initiate a mobility event such as a beam switch or inter-cell handover. According to aspects of the present disclosure, an event trigger may be based on relative changes within in a set of measurements associated with the reference beams. The information regarding event triggers may indicate which beam or set of beams should be used with respect to a specific event trigger. Stated otherwise, the event trigger information may indicate which beams are to be measured in an effort to detect an event trigger. Thus, certain reference beams may be associated with certain event triggers.

The beam set size for determining an event trigger may be signaled by the BS to the UE. According to aspects, the UE may not have a single, designated reference beam that should be used for determining an event trigger. Rather, an event trigger may be detected/determined based on relative changes between a pair of reference beams or between multiple pairs of indicated reference beams. According to one option, the BS may specify the relative changes between the reference beams which may be used to detect an event trigger.

One example of the relative change may be based on the best and worst (highest and lowest) signal quality measurement within a set of reference beams being greater than a threshold value. Thus, an event trigger may be detected when the difference between a highest RSRP associated with a beam in the set of reference beams and a lowest RSRP associated with a beam in the set of reference beams exceeds a threshold value.

According to another example, the event trigger may be based on top "N" measurements of the reference beams. For example, an event trigger may be detected when a difference between the signal quality measurements associated with, for example, the two (e.g., N=2) strongest reference beams exceeds a threshold value.

According to aspects, an event trigger may be based on combined signal strength measurements of the reference beams. For example, an event trigger may be detected when the combined measurement associated with N reference beams exceeds a threshold value. Accordingly, an event trigger may be detected when the combined signal strength measurement associated with, for example, two reference beams exceeds a threshold value.

According to aspects, the reference beams may include a mix of beams used by a serving BS and beams used by a neighboring BS. The serving BS may transmit an indication of the partition or mix of serving BS beams and neighboring BS beams to the UE. The partition may be based on physical cell ID or a measurement ID.

The event trigger may be based on a top N signal quality measurements associated with reference beams from the serving BS and a top M signal quality measurements associated with reference beams from the neighboring BS (where N and M are integers and N may be greater than, less than, or equal to M). The event trigger may be, for example, that the best signal quality measurement associated with a first set (e.g., beams of the neighboring BS) is better than the best signal quality measurement associated with a second set (e.g., beams of the serving BS) by X dB.

According to aspects, an event trigger may be based on a number of reference beams associated with a cell exceeding a threshold signal value. For example, the UE may be configured with a set of reference beams associated with the serving BS and a set reference beams associated with a neighboring BS. An event trigger may occur when the neighbor BS has a larger number of reference beams exceeding a threshold signal strength value as compared to the neighboring BS. As an example, an event trigger may occur if the neighboring cell has 10 strong reference beams, as determined by RSRP, and the serving BS has 2 strong reference beams. Thus, an event trigger may be based not only on a number of beams, but also the RSRP associated with the beams of the serving BS and neighboring BS.

According to another example, an event trigger may be based on combined signal strength measurements of the reference beams associated with the serving BS exceeding combined signal strength measurements of the reference beams associated with the neighboring BS. As an example, an event trigger may be detected when the combined measurements associated with reference beams from a neighbor BS exceeds the combined measurements associated with reference beams from the serving BS by a threshold value. Detection of this event trigger may trigger a handover from the serving BS to the neighboring BS.

The above example event triggers are provided for demonstrative purposes only. More generally, a BS may configure a UE with event triggers, which include the reference beams that the UE may use to determine if the trigger condition is met. The BS may configure the UE during a connected mode using an on-demand RS or using a PSS/SSS/RS, as described above.

In response to detecting an event trigger, the UE may transmit a report (e.g., measurement report) or indication of the trigger to the BS. The event trigger may be used for beam selection purposes by the BS and/or handover decisions.

Thus as described herein, a BS may configure the UE with one or more reference beams. The reference beams may be associated with the serving BS or a neighboring BS. The BS may also configure the UE with rules which specify one or more event triggers. The rules may specify which reference beams apply to a specific event trigger. In this manner, mobility decisions may be made in a wireless communication system using beams.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

According to aspects, the described means, including, for example, the means for receiving, means for transmitting, means for detecting, and means for taking one or more actions may be performed by one or more of antennas 452, Tx/Rx 454, processors 466, 458, 464, and/or controller/processor 480 of the UE 120 or the antenna 434, Tx/Rx 432, processors 420, 430, 438, and/or controller/processor 440 of the BS 110.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIGS. 9-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), comprising:
receiving, from a base station (BS) serving the UE, information regarding reference beams and one or more event triggers associated with the reference beams, wherein the reference beams comprise reference beams associated with the serving BS and reference beams associated with a neighboring BS;

detecting at least one of the one or more event triggers based, at least in part, on a comparison between a combined signal strength measurement for a first plurality of the reference beams associated with the neighboring BS, a combined signal strength measurement for a second plurality of the reference beams associated with the serving BS, and a first threshold value, wherein:
the first plurality of the reference beams only includes a first number of strongest reference beams associated with the neighboring BS having a signal strength exceeding a second threshold value; and
the second plurality of the reference beams only includes a second number of strongest reference beams associated with the serving BS having a signal strength exceeding the second threshold value; and
the detecting the at least one of the one or more event triggers comprises detecting the combined signal strength measurement for the first plurality of the reference beams exceeds the combined signal strength measurement for the second plurality of the reference beams by the first threshold value; and
taking one or more actions based, at least in part, on the at least one detected event trigger.

2. The method of claim 1, wherein receiving the information regarding the reference beams comprises:
receiving information regarding a beam identification (ID) associated with at least one of: one or more of the reference beams associated with the serving BS and one or more of the reference beams associated with the neighboring BS.

3. The method of claim 1, further comprising:
receiving a reference signal (RS) from the serving BS; and
transmitting a measurement report associated with the RS, wherein at least one of: one or more of the reference beams associated with the serving BS and one or more of the reference beams associated with the neighboring BS are based on the measurement report.

4. The method of claim 1, wherein taking the one or more actions further comprises:
transmitting, via a report to the serving BS, an indication of the detected one or more event triggers.

5. The method of claim 1, wherein at least one of the reference beams are part of a synchronization subframe.

6. The method of claim 5, wherein the synchronization subframe comprises at least one of a primary synchronization signal, a secondary synchronization signal, or a reference signal.

7. The method of claim 1, wherein the receiving comprises:
receiving the information regarding at least one of the reference beams via at least one of a Layer 1 control channel, Layer 2 control channel, or Layer 3 signaling.

8. The method of claim 1, wherein at least one of the one or more event triggers comprises a difference in signal strength between at least one pair of the reference beams exceeding a third threshold value, and
wherein determining the difference in signal strength between the pair of the reference beams exceeds the third threshold value comprises:
measuring a signal strength associated with two or more of the reference beams; and p1 determining a difference in signal strength between a first reference beam of the two or more of the reference beams associated with the highest signal strength and a second reference beam of the two or more of the reference beams associated with the lowest signal strength exceeds the third threshold value.

9. The method of claim 1, wherein at least one of the one or more event triggers is based on measurements associated with any combination of:
signals received from the BS on one or more of the reference beams associated with the serving BS, or
signals transmitted by the UE on one or more of the reference beams associated with at least one of: the reference beams associated with the serving BS or the reference beams associated with the neighboring BS.

10. The method of claim 1, further comprising:
determining the combined signal strength measurement for the first plurality of the reference beams associated with the neighboring BS; and
determining the combined signal strength measurement for the second plurality of the reference beams associated with the serving BS.

11. The method of claim 10, wherein:
determining the combined signal strength measurement for the first plurality of the reference beams associated with the neighboring BS comprises combining at least a first signal strength measurement corresponding to a first reference beam of the reference beams associated with the neighboring BS with a second signal strength measurement corresponding to a second reference beam of the reference beams associated with the neighboring BS; and
determining the combined signal strength measurement for the second plurality of the reference beams associated with the serving BS comprises combining at least a first signal strength measurement corresponding to a first reference beam of the reference beams associated with the serving BS with a second signal strength measurement corresponding to a second reference beam of the reference beams associated with the serving BS.

12. The method of claim 1, wherein taking one or more actions comprises switching from a first active beam associated with the serving BS to a second active beam associated with the serving BS.

13. The method of claim 1, wherein the first number of strongest reference beams associated with the neighboring BS is greater than or less than the second number of strongest reference beams associated with the neighboring BS.

14. A method of wireless communication by a base station (BS), comprising:
transmitting, to a user equipment (UE) served by the BS, information regarding reference beams and one or more event triggers associated with the reference beams, wherein the reference beams comprise references beams associated with the BS and reference beams associated with a neighboring BS;
receiving an indication of one of the one or more event triggers based, at least in part, on a comparison between a combined signal strength measurement for a first plurality of the reference beams associated with the neighboring BS, a combined signal strength measurement for a second plurality of the reference beams associated with the serving BS, and a first threshold value, wherein:
the first plurality of the reference beams only includes a first number of strongest reference beams associated with the neighboring BS having a signal strength exceeding a second threshold value; and the second plurality of the reference beams only includes a second number of strongest reference beams associated with the serving BS having a signal strength exceeding the second threshold value; and the indication of one of the one or more event triggers is received when the combined signal strength measurement for the first plurality of the reference beams exceeds the combined signal strength measurement for the second plurality of the reference beams by the first threshold value; and taking one or more actions based, at least in part, on the indication.

15. The method of claim 14, wherein transmitting the information regarding the reference beams comprises:

transmitting information regarding a beam identification (ID) associated with at least one of: one or more of the reference beams associated with the BS and one or more of the reference beams associated with the neighboring BS.

16. The method of claim 14, further comprising:

transmitting a reference signal (RS); and receiving, from the UE, a measurement report associated with the RS, wherein at least one of: one or more of the reference beams associated with the BS or one or more of the reference beams associated with the neighboring BS are based on the measurement report.

17. The method of claim 14, wherein one or more of the reference beams are transmitted in a synchronization subframe.

18. The method of claim 14, wherein the transmitting comprises:

transmitting the information regarding at least one of the one or more reference beams via at least one of a Layer 1 control channel, Layer 2 control channel, or Layer 3 signaling.

19. The method of claim 14, wherein at least one of the event triggers is based on measurements associated with any combination of:

signals transmitted by the BS on one or more of the reference beams associated with the BS, or signals received by the BS on one or more of the reference beams associated with the BS.

20. The method of claim 14, wherein taking one or more actions comprises switching from a first active beam associated with the BS to a second active beam associated with the BS for serving the UE.

21. An apparatus for wireless communication by a user equipment (UE), comprising:

at least one processor configured to:

receive, from a base station (BS) serving the UE, information regarding reference beams and one or more event triggers associated with the reference beams, wherein the reference beams comprise reference beams associated with the serving BS and reference beams associated with a neighboring BS;

detect one at least one of the one or more event triggers based, at least in part, on a comparison between a combined signal strength measurement for a first plurality of the reference beams of the reference beams associated with the neighboring BS, a combined signal strength measurement for a second plurality of the reference beams of the reference beams associated with the serving BS, and a first threshold value, wherein:

the first plurality of the reference beams only includes a first number of strongest reference beams associated with the neighboring BS having a signal strength exceeding a second threshold value; and the second plurality of the reference beams only includes a second number of strongest reference beams associated with the serving BS having a signal strength exceeding the second threshold value; and the at least one processor is further configured to detect the at least one of the one or more event triggers by detecting the combined signal strength measurement for the first plurality of the reference beams exceeds the combined signal strength measurement for the second plurality of the reference beams by the first threshold value; and take one or more actions based, at least in part, on the detected at least one event trigger; and a memory coupled to the at least one processor.

22. The apparatus of claim 21, wherein the at least one processor is configured to receive the information regarding the reference beams by: receiving information regarding a beam identification (ID) associated with at least one of: one or more of the reference beams associated with the serving BS and one or more of the reference beams associated with the neighboring BS.

23. The apparatus of claim 21, wherein the at least one processor is configured to:

receive a reference signal (RS) from the serving BS; and transmit a measurement report associated with the RS, wherein at least one of: the reference beams associated with the serving BS and the reference beams associated with the neighboring BS are based on the measurement report.

24. An apparatus for wireless communication by a base station (BS), comprising:

at least one processor configured to:

transmit, to a user equipment (UE) served by the BS, information regarding reference beams and one or more event triggers associated with the reference beams, wherein the reference beams comprise reference beams associated with the BS and reference beams associated with a neighboring BS;

receive an indication of one of the one or more event triggers based, at least in part, on a comparison between a combined signal strength measurement for a first plurality of the reference beams of the reference beams associated with the neighboring BS, a combined signal strength measurement for a second plurality of the reference beams of the reference beams associated with the serving BS, and a first threshold value, wherein:

the first plurality of the reference beams only includes a first number of strongest reference beams associated with the neighboring BS having a signal strength exceeding a second threshold value; and the second plurality of the reference beams only includes a second number of strongest reference beams associated with the serving BS having a signal strength exceeding the second threshold value; and the at least one processor is further configured to receive the indication of one of the one or more event triggers when the combined signal strength measurement for the first plurality of the reference beams exceeds the combined signal strength measurement for the second plurality of the reference beams by the first threshold value; and take one or more actions based, at least in part, on the indication; and a memory coupled to the at least one processor.

25. The apparatus of claim 24, wherein the at least one processor is configured to transmit the information regarding the reference beams by transmitting information regarding a beam identification (ID) associated with at least one of: one or more of the reference beams associated with the BS and one or more of the reference beams associated with the neighboring BS.

26. The apparatus of claim 24, wherein the at least one processor is configured to:

transmit a reference signal (RS); and receive, from the UE, a measurement report associated with the RS, wherein at least one of: one or more of the reference beams associated with the BS or one or more of the reference beams associated with the neighboring BS are based on the measurement report.

\* \* \* \* \*